(12) United States Patent
Itoshiro et al.

(10) Patent No.: US 7,520,442 B2
(45) Date of Patent: *Apr. 21, 2009

(54) INPUT DEVICE

(75) Inventors: Yasushi Itoshiro, Saitama (JP); Kazuki Taniguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/966,635

(22) Filed: Dec. 28, 2007

(65) Prior Publication Data

US 2008/0099567 A1    May 1, 2008

Related U.S. Application Data

(63) Continuation of application No. 11/461,228, filed on Jul. 31, 2006, now Pat. No. 7,331,529.

(30) Foreign Application Priority Data

Aug. 12, 2005   (JP) .............. 2005-234924

(51) Int. Cl.
   G06K 19/06   (2006.01)
   G06C 7/02    (2006.01)

(52) U.S. Cl. .................. 235/492; 235/145 R

(58) Field of Classification Search ............ 235/379, 235/380, 492; 400/472
See application file for complete search history.

(56) References Cited

U.S. PATENT DOCUMENTS

| 6,056,193 | A   |   | 5/2000  | McAuliffe et al. |         |
|-----------|-----|---|---------|------------------|---------|
| 6,935,797 | B2  | * | 8/2005  | Sim              | 400/472 |
| 2002/0109675 | A1 | * | 8/2002 | Kuan             | 345/168 |
| 2003/0174123 | A1 | * | 9/2003 | Cheng            | 345/163 |
| 2003/0197681 | A1 | * | 10/2003 | Liang           | 345/163 |
| 2005/0036814 | A1 |   | 2/2005 | Sim              |         |

FOREIGN PATENT DOCUMENTS

JP   2004-151750   5/2004

* cited by examiner

*Primary Examiner*—Karl D Frech
*Assistant Examiner*—April A Taylor
(74) *Attorney, Agent, or Firm*—Oblon, Spivak, McClelland, Maier & Neustadt, P.C.

(57) ABSTRACT

An input device for applying a signal depending on a user-operated key to an information processing device is disclosed which includes a plurality of keys including a function-key pad and a ten-key pad; and a communication section for transmitting data to and from a non-contact IC or a device equivalent to a non-contact IC; the communication section having an antenna housed in the input device and disposed above the ten-key pad and rightward of the function-key pad.

12 Claims, 10 Drawing Sheets

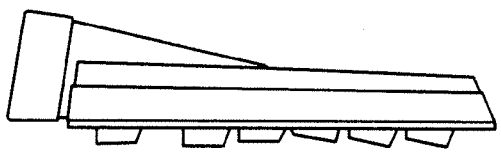
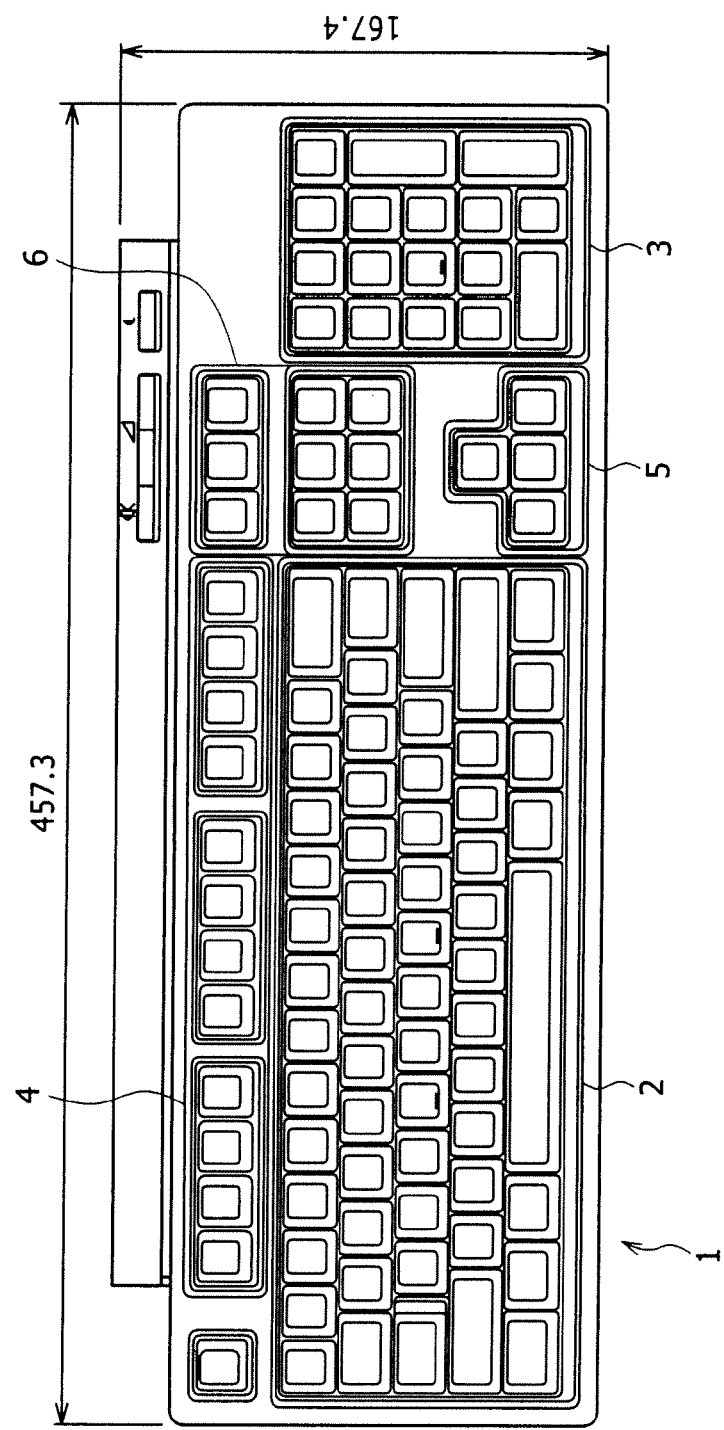

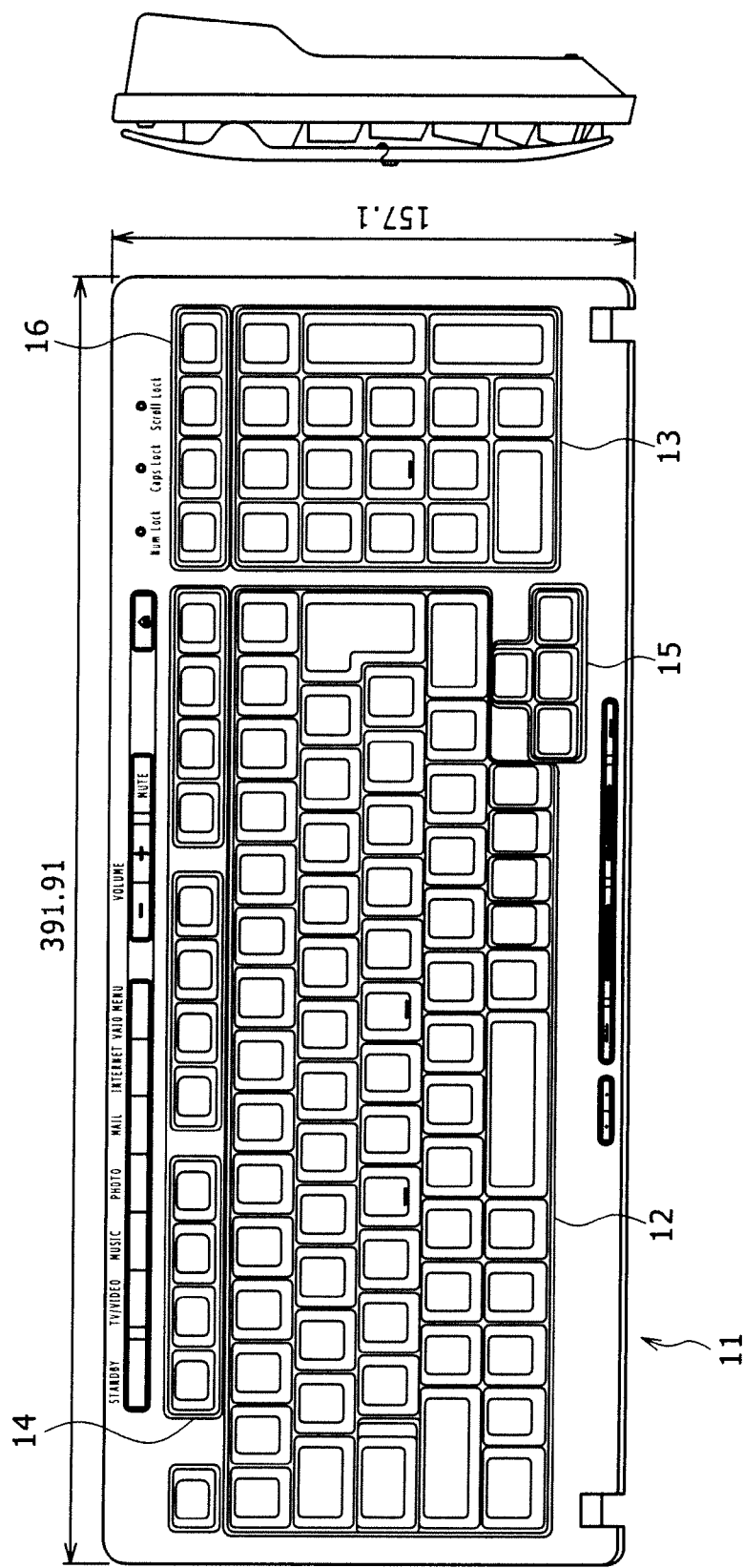

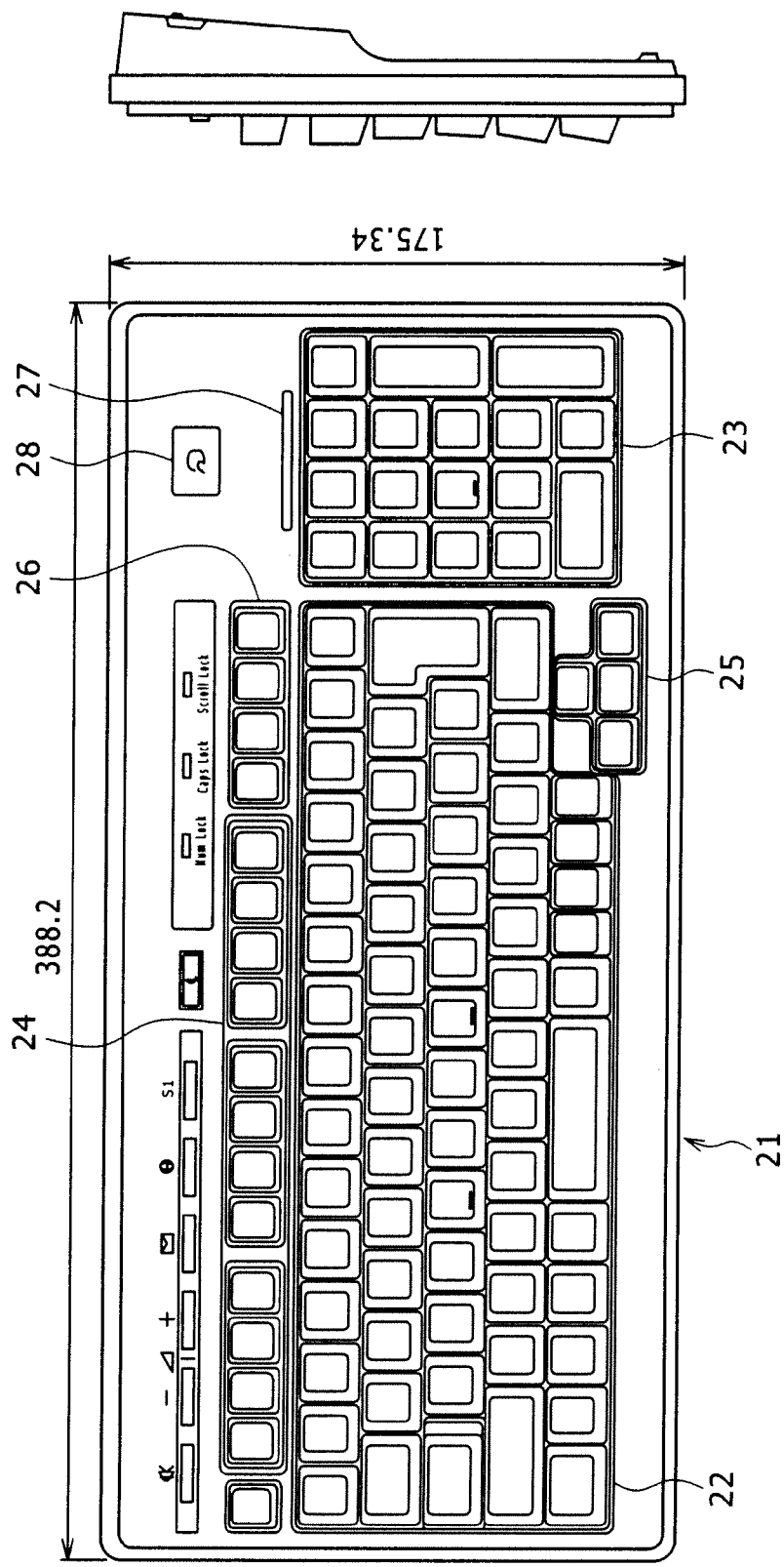

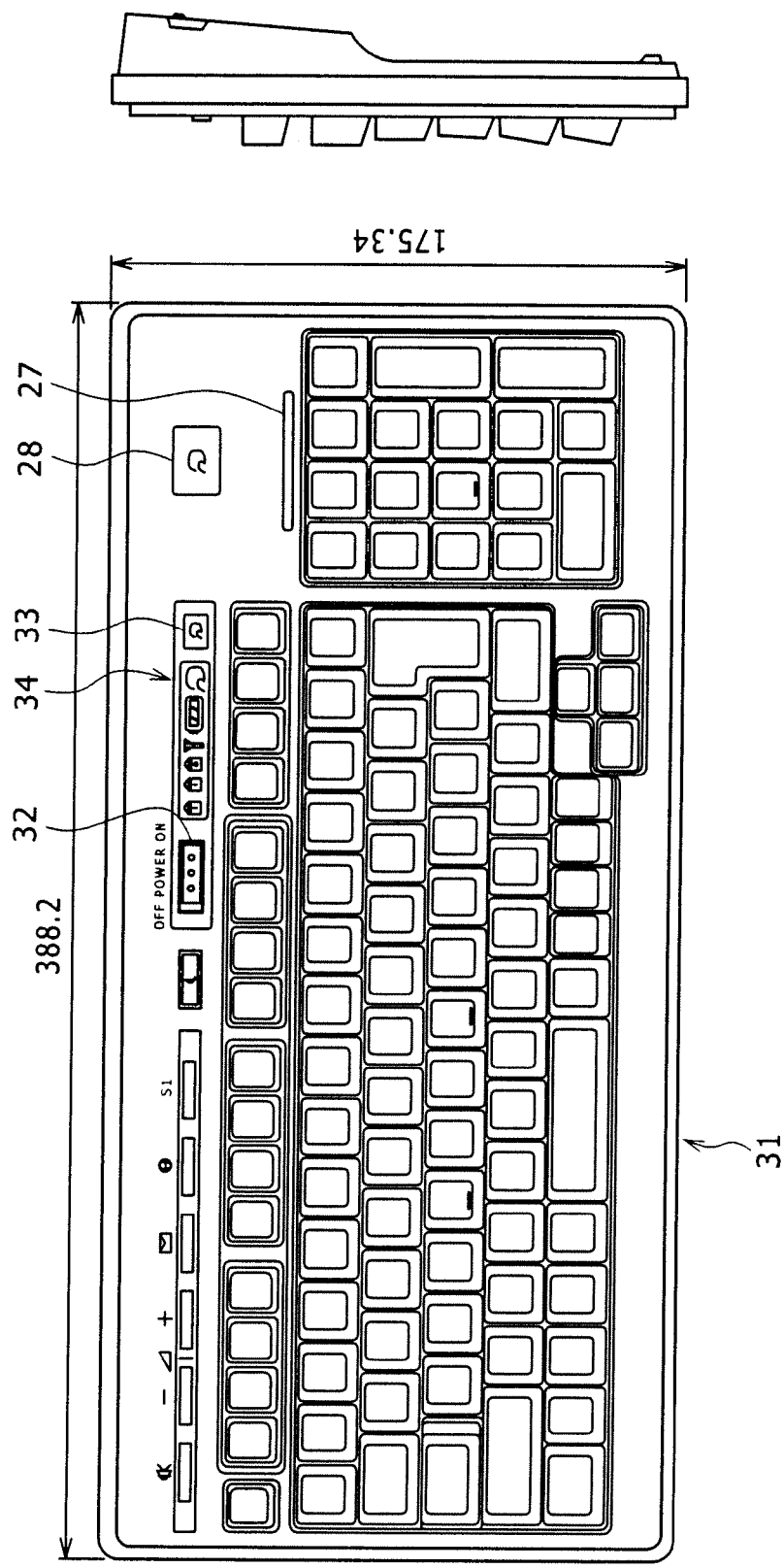

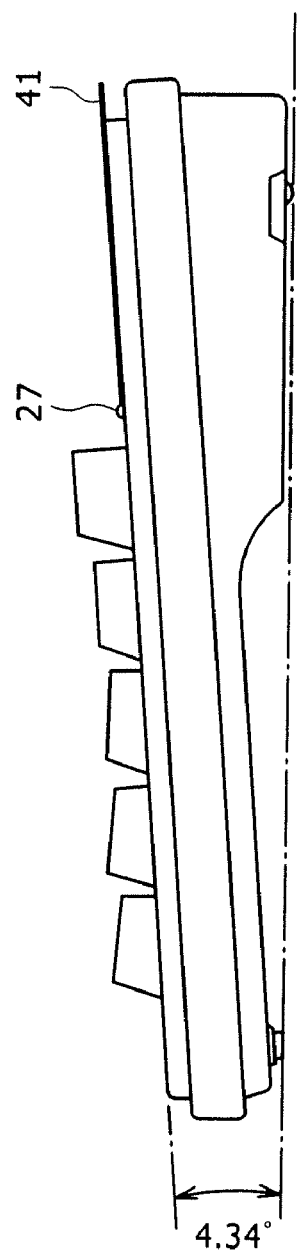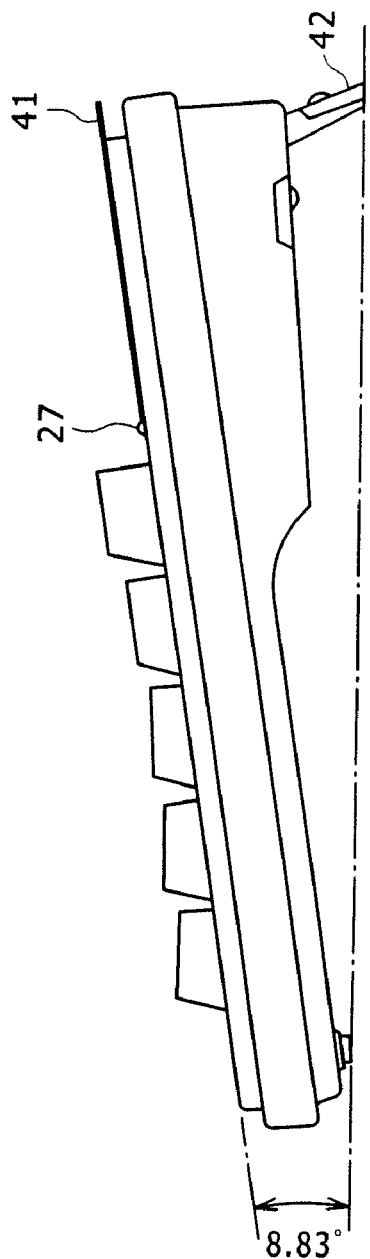
FIG. 5A
FIG. 5B

INPUT DEVICE

CROSS-REFERENCE TO RELATED APPLICATIONS

This application is a continuation of U.S. application Ser. No. 11/461,228, filed on Jul. 31, 2006, and is based upon and claims the benefit of priority from the prior Japanese Patent Application No. JP 2005-234924 filed on Aug. 12, 2005, the entire contents of each of which are incorporated herein by reference.

BACKGROUND OF THE INVENTION

1. Field of the Invention

The present invention relates to an input device, and more particularly to an input device which is capable of communicating with a non-contact IC card.

2. Description of the Related Art

There has been established a technology for non-contact transmission of data to and from IC cards (see, for example, Japanese Patent Laid-Open No. 2004-151750). The technology has been employed for various non-contact IC cards, typically the Edy (registered trademark) card having an electronic money payment function and the Suica (registered trademark) card that functions as a commuter pass or a ticket for trains. There are also known cellular phone units incorporating an IC chip similar to an IC chip contained in non-contact IC cards. Such a cellular phone unit of this type will hereinafter be referred to as a device equivalent to a non-contact IC card.

Some personal computers and PDAs (Personal Digital Assistants) have a reader/writer compatible with non-contact IC cards. The reader/writer is used for the user to confirm information recorded in a non-contact IC card, representing the balance of a prepaid amount of money or the record of uses, or to use an electronic money payment function to pay for something bought in mail-order shopping via the Internet. There is also a reader/writer compatible with non-contact IC cards which is externally connected to a personal computer by a USB (Universal Serial Bus) cable.

SUMMARY OF THE INVENTION

When a desktop personal computer is used by the user, it is often customary to place the main unit of the computer under a desk and put a display unit and a keyboard on top of the desk. If the main unit houses a reader/writer compatible with non-contact IC cards therein, then the user finds it inconvenient to use the reader/writer. If an external reader/writer compatible with non-contact IC cards is used, then it may be awkward for the user to connect a USB cable from the reader/writer to the main unit, and the reader/writer may unduly take up a space on the desk.

It is desirable to provide an input device which includes a keyboard incorporating a reader/writer compatible with non-contact IC cards for the user to use the reader/writer conveniently.

According to an embodiment of the present invention, there is provided an input device for applying a signal depending on a user-operated key to an information processing device, including a plurality of keys including a function-key pad and a ten-key pad, and a communication section for transmitting data to and from a non-contact IC card or a device equivalent to a non-contact IC card, the communication section having an antenna housed in the input device and disposed above the ten-key pad and rightward of the function-key pad.

The plurality of keys may further include a character-key pad and a cursor-key pad, the input device being of a compact configuration with at least a part of the cursor-key pad being disposed in a lower right corner of the character-key pad.

The input device may further include a stopper disposed above the ten-key pad, the stopper including a ridge having a predetermined horizontal width.

The horizontal width of the stopper may be smaller than the horizontal width of the ten-key pad.

The antenna may have a center offset rightward from the center of a placement area for the non-contact IC card which is determined by a rightmost end of the function-key pad and the stopper.

The input device may communicate with the information processing device according to predetermined wireless communication standards.

With the above arrangement, the communication section has its antenna housed in the input device and disposed above the ten-key pad and rightward of the function-key pad, for transmitting data to and from the non-contact IC card or the device equivalent to the non-contact IC card.

The user of the input device finds it convenient to use the non-contact IC card or the device equivalent to the non-contact IC card on the input device for communication therewith.

BRIEF DESCRIPTION OF THE DRAWINGS

FIG. 1A is a plan view of a full-size keyboard; FIG. 1B is a side elevational view of the full-size keyboard shown in FIG. 1A;

FIG. 2A is a plan view of a compact keyboard;

FIG. 2B is a side elevational view of the compact keyboard shown in FIG. 2A;

FIG. 3A is a plan view of a compact keyboard incorporating a reader/writer compatible with non-contact IC cards according to an embodiment of the present invention;

FIG. 3B is a side elevational view of the compact keyboard shown in FIG. 3A;

FIG. 4A is a plan view of a wireless compact keyboard incorporating a reader/writer compatible with non-contact IC cards according to another embodiment of the present invention;

FIG. 4B is a side elevational view of the wireless compact keyboard shown in FIG. 4A;

FIGS. 5A and 5B are side elevational views illustrative of how a stopper rib works;

DETAILED DESCRIPTION OF THE PREFERRED EMBODIMENTS

Figure 6A:
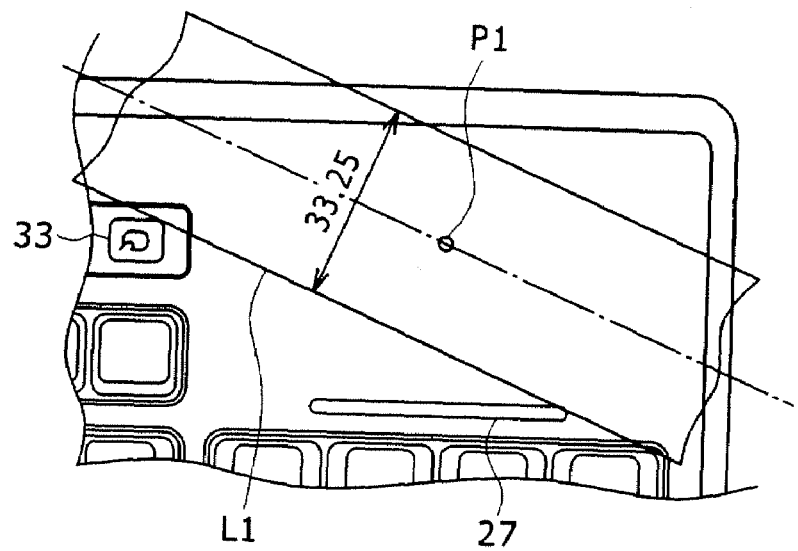
FIGS. 6A and 6B are fragmentary plan views illustrative of how effective it is for the reader/writer compatible with non-contact IC cards to be positioned in an upper right corner area of the keyboard.

The following describes, in detail, embodiments of the present invention with reference to accompanying drawings.

FIGS. 1A and 1B show a general full-size keyboard. FIG. 1A is a plan view and FIG. 1B is a side elevational view. As shown in FIGS. 1A and 1B, a general full-size keyboard 1 includes a character-key pad 2 for primarily entering characters, a ten-key pad 3 for entering numerals and calculational symbols, an F-key pad 4 of function keys disposed above the character-key pad 2 for performing predefined processes, a cursor-key pad 5 of cursor keys in four directions disposed between the character-key pad 2 and the ten-key pad 3, and an auxiliary-key pad 6 of auxiliary keys including an Insert key, a Delete key, etc.

The full-size keyboard 1 shown in FIG. 1 has no functional problem as it has all the keys that are required. However, since some users find the size of the full-size keyboard 1 (about 167 mm×about 457 mm) too large, there have been available compact keyboards that are horizontally shorter than the full-size keyboards by a dimension corresponding to the cursor-key pad 5.

FIGS. 2A and 2B show a general compact keyboard 11. FIG. 2A is a plan view and FIG. 2B is a side elevational view. As shown in FIGS. 2A and 2B, the compact keyboard 11 includes a character-key pad 12 for primarily entering characters, a ten-key pad 13 for entering numerals and calculational symbols, an F-key pad 14 of function keys disposed above the character-key pad 12 for performing predefined processes, a cursor-key pad 15 of cursor keys in four directions incorporated in a lower right corner of the character-key pad 12, and an auxiliary-key pad 16 of auxiliary keys disposed above the ten-keypad 16.

The compact keyboard 11 has a size of about 157 mm×about 392 mm, and is smaller than the full-size keyboard 1 by about 10 mm vertically and about 65 mm horizontally.

FIGS. 3A and 3B show a compact keyboard 21 incorporating a reader/writer compatible with non-contact IC cards according to an embodiment of the present invention. FIG. 3A is a plan view and FIG. 3B is a side elevational view. The compact keyboard 21 will hereinafter be referred to as an R/W-combined compact keyboard 21. The R/W-combined compact keyboard 21 is connected to a personal computer main unit by a USB cable, for example.

As shown in FIGS. 3A and 3B, the R/W-combined compact keyboard 21 includes a character-key pad 22 for primarily entering characters, a ten-key pad 23 for entering numerals and calculational symbols, an F-key pad 24 of function keys disposed above the character-key pad 22 for performing predefined processes, a cursor-key pad 25 of cursor keys in four directions incorporated in a lower right corner of the character-key pad 22, and an auxiliary-key pad 26 of auxiliary keys disposed in alignment with and rightwardly of the F-key pad 24.

The R/W-combined compact keyboard 21 incorporates therein a reader/writer compatible with non-contact IC cards, and is capable of transmitting data to and from non-contact IC cards and devices equivalent to non-contact IC cards. The R/W-combined compact keyboard 21 has a size of about 175 mm×about 388 mm, which is substantially the same as the size of the compact keyboard 11.

The R/W-combined compact keyboard 21 offers other features as follows: The function keys have a reduced size, reducing the horizontal width of the F-key pad 24, and the F-key pad 24 and the auxiliary-key pad 26 are disposed in alignment with each other and have a joint horizontal width which is the same as the horizontal width of the character-key pad 22. A stopper rib 27 is disposed in a space that is defined above the ten-key pad 23 because the auxiliary-key pad 26, which would be positioned above the ten-key pad 23 on a general compact keyboard, is shifted to a position next to the F-key pad 24. The stopper rib 27 includes a ridge having a horizontal width smaller than the horizontal width of the ten-key pad 23. The horizontal width of the stopper rib 27 will be described in detail later.

A center mark 28 is applied to the center of an upper right corner area of the R/W-combined compact keyboard 21. The upper right corner area has a left end aligned with the right end of the auxiliary-key pad 26 and a lower end aligned with the stopper rib 27. The center mark 28 represents a position in which a non-contact IC card is to be placed (actually, a non-contact IC card may be held over the center mark 28 for communications), or in other words, a position (strictly, a point Pcc shown in FIG. 8A) in which an antenna board 51 (see FIG. 7) of the reader/writer compatible with non-contact IC cards is disposed. The auxiliary-key pad 26 and the stopper rib 27 project from the surface of the R/W compact keyboard 21 and hence serve as stoppers for the user to position a non-contact IC card accurately in the upper right corner area of the R/W-combined compact keyboard 21.

FIGS. 4A and 4B show a wireless compact keyboard 31 incorporating a reader/writer compatible with non-contact IC cards according to another embodiment of the present invention. FIG. 4A is a plan view and FIG. 4B is a side elevational view. The wireless compact keyboard 31 will hereinafter be referred to as an R/W-combined wireless compact keyboard 31. The R/W-combined wireless compact keyboard 31 is connected to a personal computer main unit by a wireless communication link according to the wireless USB standards, for example.

The R/W-combined wireless compact keyboard 31 is of basically the same profile as the R/W-combined compact keyboard 21 shown in FIGS. 3A and 3B. Since the R/W-combined wireless compact keyboard 31 contains a battery as it is wireless, the R/W-combined wireless compact keyboard 31 additionally has an on/off switch 32 for turning on and off the keyboard itself in order to prevent the battery from being unduly consumed, a card R/W key 33 for activating the function of the reader/writer compatible with non-contact IC cards which is incorporated in the R/W-combined wireless compact keyboard 31, and a card indicator 34 for indicating whether the function of the reader/writer compatible with non-contact IC cards is activated or not. The reader/writer compatible with non-contact IC cards which is incorporated in the R/W-combined wireless compact keyboard 31 will automatically be inactivated upon elapse of a predetermined period of time after the reader/writer has been activated.

The stopper rib 27 will be described below. FIGS. 5A and 5B show in side elevation the R/W-combined compact keyboard 21 or the R/W-combined wireless compact keyboard 31. In FIG. 5A, a tilt leg 42 for changing the gradient of the keyboard surface is folded to tilt the keyboard surface at an angle of 4.34°. In FIG. 5B, the tilt leg 42 is extended to tilt the keyboard surface at an angle of 8.83°.

When the tilt leg 42 is extended, a non-contact IC card 41 that is placed in the upper right corner area is prevented by the stopper rib 27 from slipping to the left (FIG. 5B), i.e., toward the ten-key pad 23. In the absence of the stopper rib 27, the non-contact IC card 41 placed in the upper right corner area would slip into abutment against the ten-key pad 23, whose uppermost keys could not be used when the non-contact IC card 41 is communicating with the reader/writer incorporated in the compact keyboard. Accordingly, the stopper rib 27 is highly effective to keep the non-contact IC card 41 in place in the upper right corner area.

The antenna board 51 of the reader/writer compatible with non-contact IC cards is housed in the compact keyboard. Specifically, a device equivalent to non-contact IC cards has an IC chip antenna whose center is usually aligned with the central line of a shorter side of the device equivalent to non-contact IC cards. If the center of the antenna board 51 of the reader/writer compatible with non-contact IC cards is aligned with a point PI shown in FIG. 6A, then since a straight line L1 determined by the card R/W key 33 and the stopper rib 27 is fixed, devices equivalent to non-contact IC cards which have a width up to about 33 mm can be used for communication with the compact keyboard.

Figure 6B:
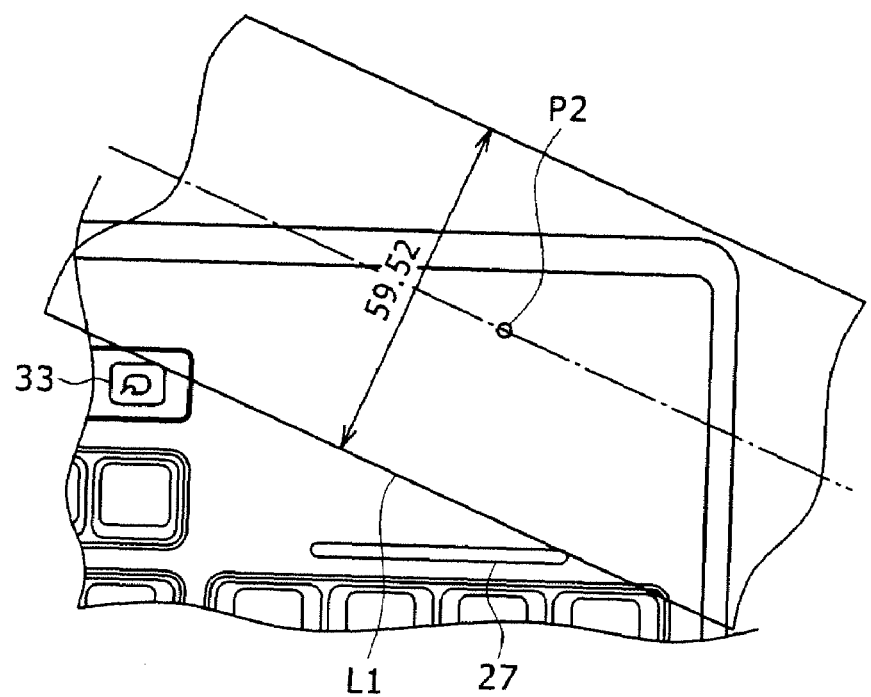

If the center of the antenna board 51 of the reader/writer compatible with non-contact IC cards is aligned with a point P2 shown in FIG. 6B, which is upward and rightward of the point Pi, then devices equivalent to non-contact IC cards which have a width up to about 60 mm can be used for communication with the compact keyboard.

Therefore, as the center of the antenna board 51 is positioned more upward and rightward in the upper right corner area, devices equivalent to non-contact IC cards which have greater widths can be used for communication with the compact keyboard.

Figure 7:
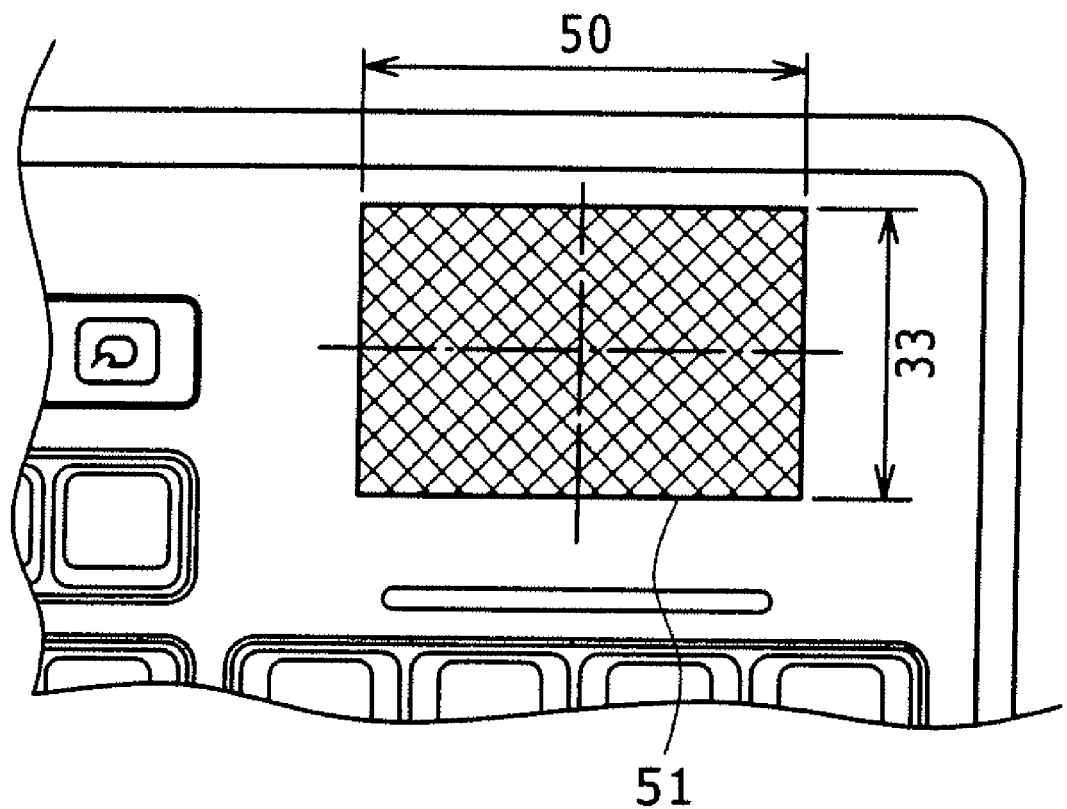
FIG. 7 is a fragmentary plan view illustrative of how effective it is for the reader/writer compatible with non-contact IC cards to be positioned in the upper right corner area of the keyboard.

However, as shown in FIG. 7, because the antenna board 51 has a certain size (33 mm×50 mm), there is a limitation on upward adjustment of the center of the antenna board 51. Horizontal adjustment of the center of the antenna board 51 will be described below.

Figure 8A:
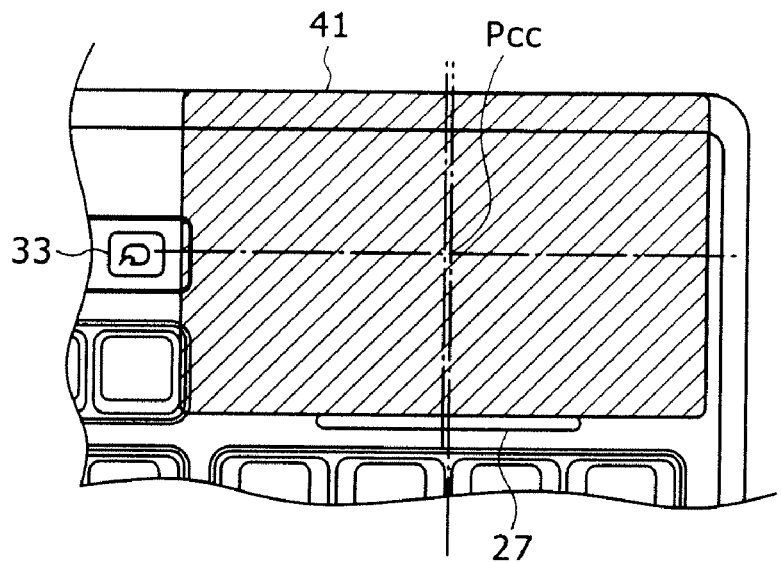
FIGS. 8A and 8B are fragmentary plan views illustrative of how effective it is for the reader/writer compatible with non-contact IC cards to be positioned in the upper right corner area of the keyboard.

As shown in FIG. 8A, when a non-contact IC card is placed in the upper right corner area of the R/W-combined compact keyboard 21, the non-contact IC card is positionally limited by the card R/W key 33 and the stopper rib 27 at the time the non-contact IC card is in the leftmost position. The center of the non-contact IC card in the leftmost position is referred to as a point Pcc. It is assumed that a standard non-contact IC card has a size of about 86 mm×about 54 mm.

Figure 8B:
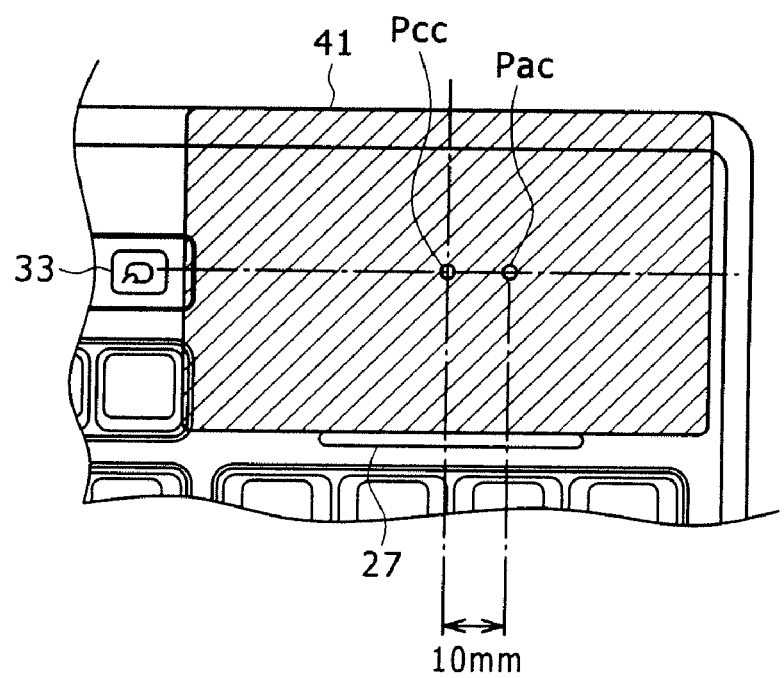

The reader/writer compatible with non-contact IC cards allows the center of the antenna board 51 and the center of the antenna of a non-contact IC card or a device equivalent to non-contact IC cards to be displaced vertically and horizontally out of alignment with each other by an error of ±10 mm. Specifically, even when the center of the antenna board 51 is positioned horizontally out of alignment with the point Pcc by 10 mm, as shown in FIG. 8B, the reader/writer can communicate with the non-contact IC card 41 that is positioned as shown in FIG. 8B. As shown in FIG. 8B, therefore, the antenna board 51 is placed such that the center of the antenna board 51 is located at a point Pac which is 10 mm spaced rightward from the point Pcc. It is assumed that the center mark 28 is aligned with the point Pcc, not the point Pac.

Though the stopper rib 27 should preferably have its horizontal width equal to the horizontal width of the ten-key pad 23 from an aesthetic design standpoint, the stopper rib 27 is shorter than the horizontal width of the ten-key pad 23 according to an embodiment of the present invention. The reasons for the shorter stopper rib 27 will be described below. It is assumed that the center of the antenna board 51 is aligned with the point Pac.

Figure 9A:
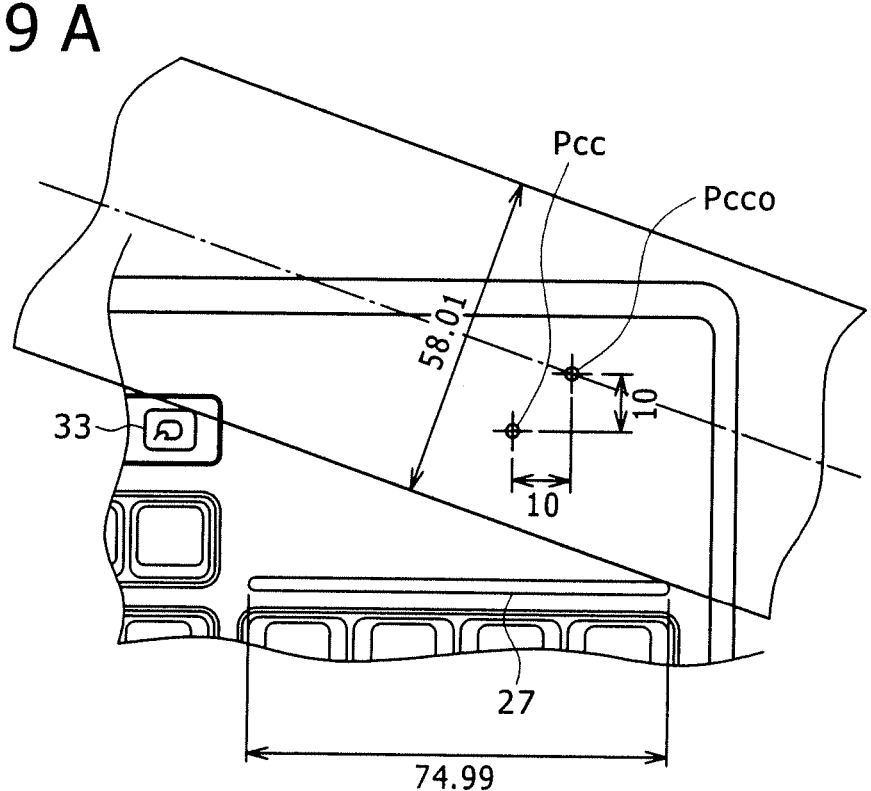
FIGS. 9A and 9B are fragmentary plan views illustrative of how effective it is for the stopper rib to be narrower than a ten-key pad.

If the horizontal width of the stopper rib 27 is equal to the horizontal width of the ten-key pad 23 and is about 75 mm, as shown in FIG. 9A, then devices equivalent to non-contact IC cards which have a width up to about 58 mm can be used for communication with the compact keyboard.

Figure 9B:
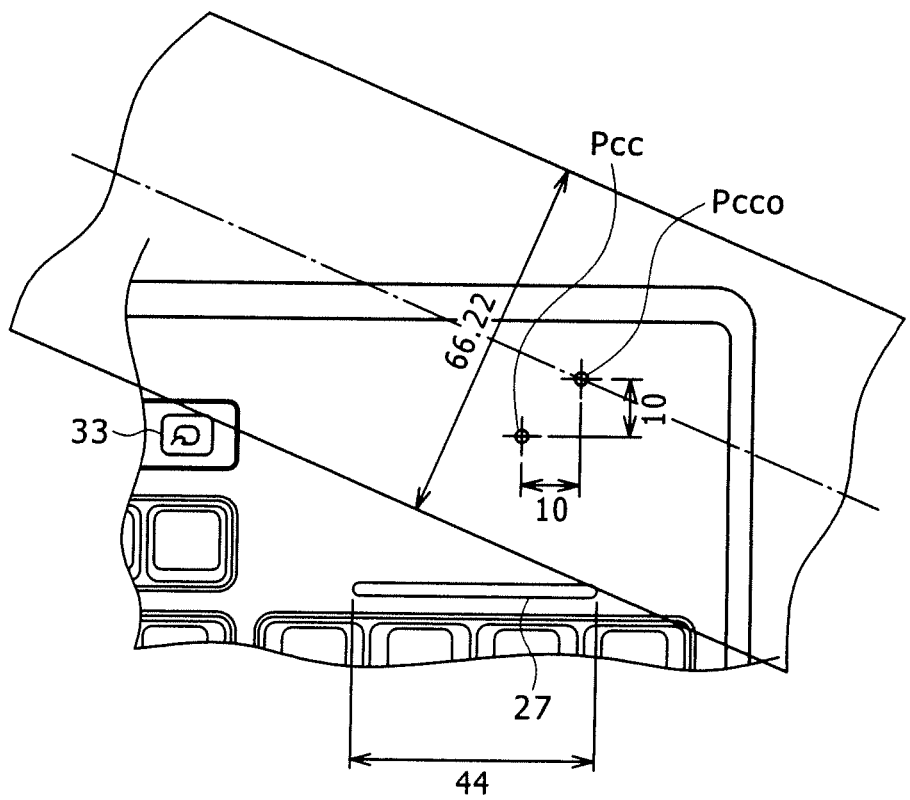

If the horizontal width of the stopper rib 27 is shorter than the horizontal width of the ten-key pad 23 and is about 44 mm, as shown in FIG. 9B, then devices equivalent to non-contact IC cards which have a width up to about 66 mm can be used for communication with the compact keyboard.

It is assumed that a device equivalent to non-contact IC cards has a center of gravity aligned with the central line of a shorter side of the device. Stability of the device that is placed on the compact keyboard will be described below.

Figure 10A:
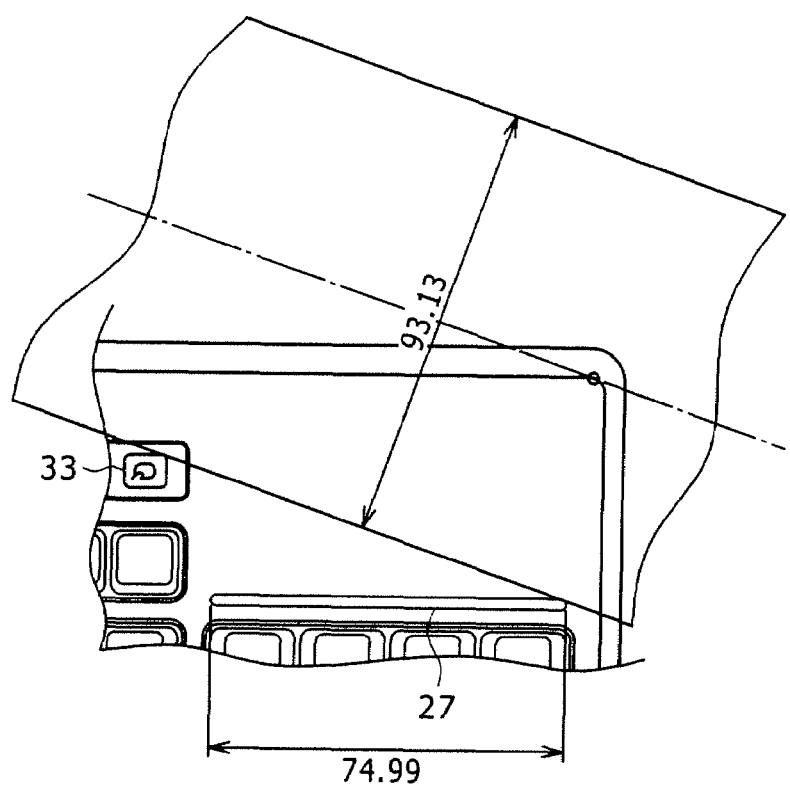
FIGS. 10A and 10B are fragmentary plan views illustrative of how effective it is for the stopper rib to be narrower than the ten-key pad.

If the horizontal width of the stopper rib 27 is equal to the horizontal width of the ten-key pad 23 and is about 75 mm, as shown in FIG. 10A, then devices equivalent to non-contact IC cards which have a width up to about 93 mm can be used for communication with the compact keyboard.

Figure 10B:
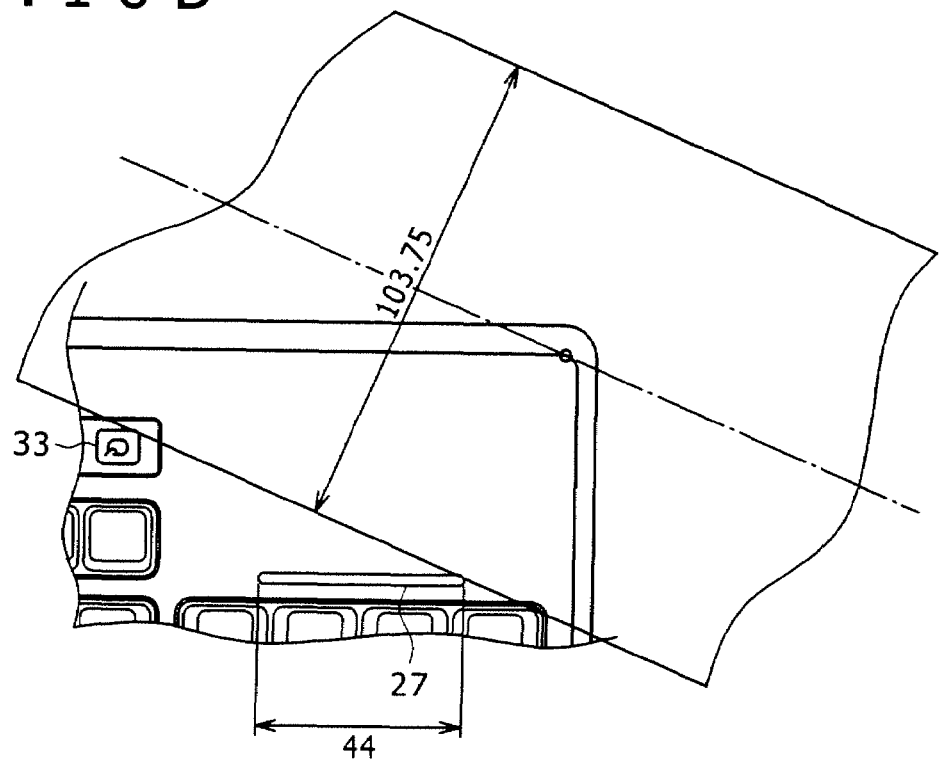

If the horizontal width of the stopper rib 27 is shorter than the horizontal width of the ten-key pad 23 and is about 44 mm, as shown in FIG. 10B, then devices equivalent to non-contact IC cards which have a width up to about 104 mm can be used for communication with the compact keyboard.

Therefore, as the horizontal width of the stopper rib 27 is shorter than the horizontal width of the ten-key pad 23, devices equivalent to non-contact IC cards which have greater widths can be used for communication with the compact keyboard.

As described above, the R/W-combined compact keyboard 21 and the R/W-combined wireless compact keyboard 31 according to an embodiment of the present invention incorporates therein a reader/writer compatible with non-contact IC cards. Specifically, the reader/writer is positioned in the upper right corner area of the keyboard and has an antenna board whose center is determined in view of the size of a non-contact IC card or the size of a device equivalent to non-contact IC cards, and a stopper rib having a horizontal width shorter than the horizontal width of a ten-key pad on the keyboard is disposed above the ten-key pad. The R/W-combined compact keyboard 21 and the R/W-combined wireless compact keyboard 31 can conveniently be used by the user, and can be used for communication with large-sized devices equivalent to non-contact IC cards.

Although certain preferred embodiments of the present invention have been shown and described in detail, it should be understood that various changes and modifications may be made therein without departing from the scope of the appended claims.

What is claimed is:

1. An input device for applying a signal depending on a user-operated key to an information processing device, comprising:
   a plurality of keys including a function-key pad and a ten-key pad;
   communication means for transmitting data to and from a non-contact IC or a device including a non-contact IC; and
   a placement area configured to receive the non-contact IC or a device including a non-contact IC above said ten-key pad and rightward of said function-key pad,
   wherein said communication means has an antenna housed in the input device and disposed above said ten-key pad and rightward of said function-key pad, and said antenna has a center offset rightward from a center of the placement area.

2. The input device according to claim 1, wherein said plurality of keys further includes a character-key pad and a cursor-key pad, said input device being of a compact configuration with at least a part of said cursor-key pad being disposed in a lower right corner of said character-key pad.

3. The input device according to claim 1, further comprising:
a stopper disposed above said ten-key pad, said stopper including a ridge having a predetermined horizontal width.

4. The input device according to claim 3, wherein a horizontal width of the stopper is smaller than a horizontal width of said ten-key pad.

5. The input device according to claim 1, wherein said input device communicates with said information processing device according to predetermined wireless communication standards.

6. The input device according to claim 1, wherein said placement area is on a top surface of said input device.

7. An input device for applying a signal depending on a user-operated key to an information processing device, comprising:
a plurality of keys including a function-key pad and a ten-key pad;
a communication unit configured to transmit data to and from a non-contact IC or a device including a non-contact IC; and
a placement area configured to receive the non-contact IC or a device including a non-contact IC above said ten-key pad and rightward of said function-key pad,
wherein said communication unit includes an antenna housed in the input device and disposed above said ten-key pad and rightward of said function-key pad, and said antenna has a center offset rightward from a center of the placement area.

8. The input device according to claim 7, wherein said plurality of keys further includes a character-key pad and a cursor-key pad, said input device being of a compact configuration with at least a part of said cursor-key pad being disposed in a lower right corner of said character-key pad.

9. The input device according to claim 7, further comprising:
a stopper disposed above said ten-key pad, said stopper including a ridge having a predetermined horizontal width.

10. The input device according to claim 9, wherein a horizontal width of the stopper is smaller than a horizontal width of said ten-key pad.

11. The input device according to claim 7, wherein said input device communicates with said information processing device according to predetermined wireless communication standards.

12. The input device according to claim 7, wherein said placement area is on a top surface of said input device.

* * * * *